Patented Aug. 4, 1953

2,647,918

UNITED STATES PATENT OFFICE 2,647,918

SATURATED CARBOCYCLIC OXOESTERS AND PROCESS FOR THEIR PREPARATION

Tracy M. Patrick, Jr., Dayton, Ohio, assignor to Monsanto Chemical Company, St. Louis, Mo., a corporation of Delaware No Drawing. Application June 23, 1950, Serial No. 170,046

19 Claims. (Cl. 260—483)

This invention relates to a novel process for the preparation of carbocyclic oxoesters comprising the reaction of saturated aldehydes with alicyclic and aromatic esters of a 4- to 6-carbon atom ethylenic unsaturated polycarboxylic acid in the presence of a free radical promoting agent.

This application is a continuation-in-part of the copending application of T. M. Patrick, Jr. and E. W. Gluesenkamp, Serial No. 135,829, filed December 29, 1949, for the free radical induced reaction of a saturated aldehyde with a 4- to 6-carbon atom ethylenic unsaturated polycarboxylic acid and alkyl esters thereof.

It has now been found that carbocyclic oxoesters can be prepared in good yields by reacting a saturated aldehyde with a carbocyclic ester, partial ester, or mixed ester of a 4- to 6-carbon atom ethylenic unsaturated polycarboxylic acid, wherein the ethylenic bond is conjugated with at least one of the carbonyl groups, and mixtures thereof in the presence of a free radical promoting agent.

The carbocyclic oxoesters of this invention can be diagrammatically represented by the structural formula

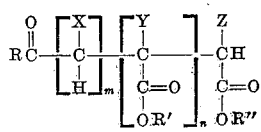

wherein X is selected from the group consisting of —H, —COOR''' and —CH$_2$COOR$^{iv}$; $m$ is a small whole number from 0 to 1; Y and Z are selected from the group consisting of —H and —CH$_3$; $n$ is a small whole number from 0 to 1; the sum of $m$ plus $n$ is a small whole number from 1 to 2; R is a saturated hydrocarbon radical containing up to 17 carbon atoms; R', R'', R''' and R$^{iv}$ are 3- to 20-carbon atom saturated carbocyclic radicals, R'' and R$^{iv}$ can also be —H, and R' can be —H when $m$ equals 1; and at least one of said R', R'', R''' and R$^{iv}$ groups is a carbocyclic radical.

The carbocyclic esters of the 4- to 6-carbon atom ethylenic unsaturated polycarboxylic acids can be mono-, di-, and tri-esters and can also be mixed esters. Suitable 4- to 6-carbon atom ethylenic unsaturated polycarboxylic acids are, for example, maleic acid, fumaric acid, citraconic acid, mesaconic acid, itaconic acid, aconitic acid, glutaconic acid and the like. The 3- to 20-carbon atom saturated carbocyclic ester radicals can be selected from the group consisting of aryl, aralkyl and cycloalkyl radicals, as for example, phenyl, tolyl, xylyl, mesityl, cumyl, biphenylyl, naphthyl, benzyl, phenethyl, cyclopropyl, cyclohexyl, bicyclohexylyl, tetrahydronaphthyl, decahydronaphthyl, tetrahydroabietyl, dehydroabietyl and the like and mixtures thereof. Thus, esters, partial esters and mixed esters of the above acids can be, for example, phenyl hydrogen maleate, benzyl hydrogen maleate, cyclohexyl hydrogen maleate, dehydroabietyl hydrogen maleate, tetrahydroabietyl hydrogen maleate, diphenyl maleate, ditolyl maleate, dibenzyl maleate, diphenethyl maleate, dicyclopropyl maleate, dicyclobutyl maleate, dicycloamyl maleate, dicyclohexyl maleate, phenyl benzyl maleate, phenyl cyclohexyl maleate, phenethylcycloamyl maleate and the like. Whereas the foregoing examples are limited to maleates, it will be readily understood that similar compounds of other 4- to 6-carbon atom ethylenic unsaturated polycarboxylic acids can be employed.

From the above it will be apparent that by the term "saturated carbocyclic radical" the conventional exception is made for normal benzene-ring unsaturation.

When the aldehyde reacts with the unsaturated polycarboxylic acid or partial ester such that the carbon atom with which the acyl group forms a new carbon-carbon bond also has a carboxyl radical attached thereto the compound so formed is in general unstable, evolving carbon dioxide from the carboxyl radical. When the carboxyl group is esterified, prior to the reaction with the aldehyde, decarboxylation does not occur. Thus in the process of this invention the substantially completely esterified acids are preferably employed.

The saturated aldehydes can be selected from the group consisting of aliphatic, alicyclic and heterocyclic aldehydes, as for example, ethanal, propanal, butanal, pentanal, hexanal, heptanal, octanal, nonanal, decanal, dodecanal, tetradecanal, hexadecanal, octadecanal, 2-ethylhexanal, hexahydrobenzaldehyde, tetrahydrofurfural and the like. The saturated aliphatic aldehydes are preferred.

It will be seen that the above range of variables encompasses compounds having molecular weights from about 156 to about 1300. In general, however, it is preferable that the R groups are not simultaneously at the maximum thus compounds with a molecular weight of up to about 800 are preferred and substantially completely esterified compounds having a molecular weight of from about 240 to about 560 are more specifically preferred.

The free radical promoting agents are, for example, acetyl peroxide, benzoyl peroxide, lauroyl peroxide, hydrogen peroxide, peracetic acid, sodium perborate, ultraviolet radiation and the like. The free radical promoting catalyst is generally employed at from about 0.1 to about 5 mole per cent and preferably from about 0.25 to about 2 mole per cent based on the carbocyclic esters of the 4- to 6-carbon atom ethylenic unsaturated polycarboxylic acid; and the catalyst can be added all at once, in increments or continuously over a period of time.

The novel process of this invention in general provides good yields of the carbocyclic oxoesters, enables relatively easy recovery of the unreacted aldehyde and preferably employs economical raw materials which are readily commercially available.

It might be expected that any unsaturated polymerizable monomer could readily be reacted with a saturated aldehyde to produce a carbocyclic oxoester. This, however, is not the case since monomers which polymerize relatively easily to the polymer will tend to do so thus producing a high molecular weight resin with little or no reaction with the aldehyde to form a ketone. Thus, the reaction is in general limited to those unsaturated compounds which cannot be readily polymerized alone.

Polycarboxylic acid anhydrides, as for example, maleic anhydride and itaconic anhydride are employed in many compositions to provide heteropolymers with the above type reactive monomers, as for example, styrene and vinyl acetate. Maleic acid and esters thereof can also form heteropolymers with the above reactive monomers, however, they are less reactive than the anhydride which is generally preferred. It has now surprisingly been found that 4- to 6-carbon atom ethylenic unsaturated polycarboxylic acid anhydrides such as maleic and itaconic anhydride are not reactive with saturated aldehydes in the presence of a free radical promoting agent, whereas the free acid and esters thereof are reactive. Thus, reactions of this nature are not readily predictable.

The following examples are illustrative of the invention:

*Example 1*

A 140.2-g. sample (0.5 mole) of dicyclohexyl maleate and 108 g. (1.5 moles) of redistilled n-butanal were added to a 500-ml. round-bottomed flask. The flask was fitted with a reflux condenser and a thermometer and was supported by an electric heating mantle. The mixture of ester and aldehyde was heated to reflux (85.0° C.) at which time 1.0 g. of benzoyl peroxide was added and refluxing continued. After 5 hours the reflux temperature had risen to 91.3° C. At this time an additional 0.2 g. of benzoyl peroxide was added and refluxing continued. After a total reaction time of 21 hours the reflux temperature was 91.8° C. and the heating was discontinued. The medium amber liquid was then fractionally distilled to recover the excess n-butanal and any unreacted dicyclohexyl maleate. The principal product obtained in a yield of 83 per cent (146.5 g.) was a deep yellow liquid boiling at 178 to 185° C. at 1 mm. (mostly 180° C. at 1 mm.) having a refractive index of 1.4728 at 25° C. and a density $$\left(\tfrac{25}{25}\right)$$

of 1.0475. The product was identified as dicyclohexyl butyrylsuccinate.

Calculated for $C_{20}H_{32}O_5$: C, 68.15; H, 9.15. Found: C, 68.08; H, 9.01.

A residue (22.8 g.) of a dark amber viscous liquid telomeric product of n-butanal and dicyclohexyl maleate was also obtained.

*Example 2*

A 98.8-g. sample (0.33 mole) of redistilled dibenzyl maleate and 72 g. (1.0 mole) of redistilled n-butanal were added to a 500-ml. round-bottomed flask equipped as in Example 1. The mixture was brought to reflux (84.2° C.) at which time 0.5 g. of benzoyl peroxide was added. The refluxing was continued for 16 hours after which time the reflux temperature was 93° C. and heating was discontinued. The dark amber liquid was distilled to recover the excess n-butanal and any unreacted dibenzyl maleate. The residue was an amber viscous liquid which was obtained in a yield of about 97 per cent based on the one to one adduct. This residue was further distilled to obtain 96.2 g. of a deep yellow liquid boiling at about 215° C. at 1 mm. and having a refractive index of 1.5268 at 25° C. and a density $$\left(\tfrac{25}{25}\right)$$

of 1.1209. The product was identified as dibenzyl butyrylsuccinate.

Calculated for $C_{22}H_{24}O_5$: C, 71.71; H, 6.56. Found: C, 71.59; H, 6.46.

A residue (18 g.) of a brown viscous liquid telomeric product was also obtained.

Other compounds which can be prepared by the free radical induced reaction described herein are, for example:

Diphenyl acetylsuccinate,
Diphenyl butyrylsuccinate,
Diphenethyl propionylsuccinate,
Dicyclohexyl heptanoylsuccinate,
Dicyclohexyl acetylsuccinate,
Dicyclopropyl valerylsuccinate,
Benzyl cyclopentyl butyrylsuccinate,
Tricyclohexyl α-butyryltricarballylate,
Triphenyl α-heptanoyltricarballylate, and the like.

In order to achieve good yields of the carbocyclic oxoester an excess of the aldehyde is preferred. In general it is preferable to have from about 2 to about 5 moles of aldehyde per mole of ester. The excess aldehyde can be recovered by fractional distillation of the reaction mixture or by the preparation of the bisulfite addition product in neutral solution with subsequent extraction and regeneration of the aldehyde. For the higher molecular weight products fractional molecular distillation is necessary to effect separation without decomposition where the relatively pure carbocyclic oxoester is desired. In general, however, the excess aldehyde can be readily removed and a relatively small amount of an unreacted high molecular weight carbocyclic ester of the unsaturated polycarboxylic acid, which would be difficult or impossible to remove by normal distillation, is not detrimental for many applications. Thus carbocyclic oxoester products of high molecular weight can be a mixture consisting substantially of the desired product with small amounts of unreacted ester and telomers as impurities therein.

The carbocyclic oxoesters of this invention can be employed as chemical intermediates, plasticizers and modifiers in coating, plastic and solvent formulations.

I claim:
1. A compound having the formula

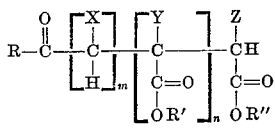

wherein X is selected from the group consisting of —H, —COOR''' and —CH₂COOR^iv; $m$ is a small whole number from 0 to 1; Y and Z are selected from the group consisting of —H and —CH₃; $n$ is a small whole number from 0 to 1; the sum of $m$ plus $n$ is a small whole number from 1 to 2; R is a saturated hydrocarbon radical containing up to about 17 carbon atoms; R'' and R^iv are selected from the group consisting of —H and 3- to 20-carbon atom saturated hydrocarbon carbocyclic radicals; R''' is a 3- to 20-carbon atom saturated hydrocarbon carbocyclic radical; R' is selected from the group consisting of —H (when $m$ equals 1) and a 3- to 20-carbon saturated hydrocarbon carbocyclic radical and at least one of said R', R'', R''' and R^iv groups is a carbocyclic radical.

2. The compounds of claim 1 having a molecular weight of from about 156 to about 800.
3. The compounds of claim 2 wherein the carboxyl radicals are completely esterified.
4. The compounds of claim 1 having a molecular weight of from about 240 to about 560 wherein R is an alkyl radical and the carboxyl radicals are completely esterified.
5. The compound dicyclohexyl butyrylsuccinate.
6. The compound dibenzyl butyrylsuccinate.
7. The compound diphenyl butyrylsuccinate.
8. The compound dicyclohexyl heptanoylsuccinate.
9. The compound tricyclohexyl α-butyryltricarballylate.
10. The process of preparing a compound having the formula

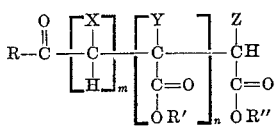

wherein X is selected from the group consisting of —H, —COOR''' and —CH₂COOR^iv; $m$ is a small whole number of 0 to 1; Y and Z are selected from the group consisting of —H and —CH₃; $n$ is a small whole number from 0 to 1; the sum of $m$ plus $n$ is a small whole number from 1 to 2; R is a saturated hydrocarbon radical containing up to about 17 carbon atoms; R'' and R^iv are selected from the group consisting of —H and 3- to 20-carbon atom saturated hydrocarbon carbocyclic radicals; R''' is a 3- to 20-carbon atom saturated hydrocarbon carbocyclic radical; R' is selected from the group consisting of —H (when $m$ equals 1) and a 3- to 20-carbon saturated hydrocarbon carbocyclic radical; and at least one of said R', R'', R''' and R^iv groups is a carbocyclic radical; comprising the reaction of a molar excess of a saturated aldehyde with a carbocyclic ester of a 4- to 6- carbon atom ethylenic unsaturated polycarboxylic acid, wherein the ethylenic bond is conjugated with at least one of the carbonyl groups and the saturated carbocyclic radical contains from 3 to 20 carbon atoms, in the presence of a free radical promoting agent.

11. The process of claim 10 wherein the compounds have a molecular weight of from about 156 to about 800 and from about 2 to about 5 moles of said aldehyde are employed per mole of said carbocyclic ester.
12. The process of claim 10 wherein the free radical promoting agent is benzoyl peroxide.
13. The process of claim 10 wherein the free radical promoting agent is ultraviolet radiation.
14. The process of claim 10 wherein the compounds have a molecular weight of from about 240 to about 560, R is an alkyl radical, the carboxyl radicals are completely esterified, from about 2 to about 5 moles of said aliphatic aldehyde are employed per mole of said carbocyclic ester, and the free radical promoting agent is benzoyl peroxide.
15. The process of claim 14 wherein the aldehyde is butanal and the carbocyclic ester is dibenzyl maleate.
16. The process of claim 14 wherein the aldehyde is butanal and the carbocyclic ester is diphenyl maleate.
17. The process of claim 14 wherein the aldehyde is heptanal and the carbocyclic ester is dicyclohexyl maleate.
18. The process of claim 14 wherein the aldehyde is butanal and the carbocyclic ester is tricyclohexyl aconitate.
19. The process of preparing dicyclohexyl butyrylsuccinate comprising the reaction of from about 2 to about 5 moles of butanal with 1 mole of dicyclohexyl maleate in the presence of the free radical promoting agent, benzoyl peroxide.

TRACY M. PATRICK, Jr.

References Cited in the file of this patent

UNITED STATES PATENTS

| Number | Name | Date |
|---|---|---|
| 2,332,896 | D'Alelio | Oct. 26, 1943 |
| 2,332,897 | D'Alelio | Oct. 26, 1943 |
| 2,332,900 | D'Alelio | Oct. 26, 1943 |
| 2,334,545 | D'Alelio | Nov. 11, 1943 |
| 2,373,548 | D'Alelio | Apr. 16, 1945 |

OTHER REFERENCES

Rupe, Annalen, 420 (1920), pp. 77–80.